Figure 1:
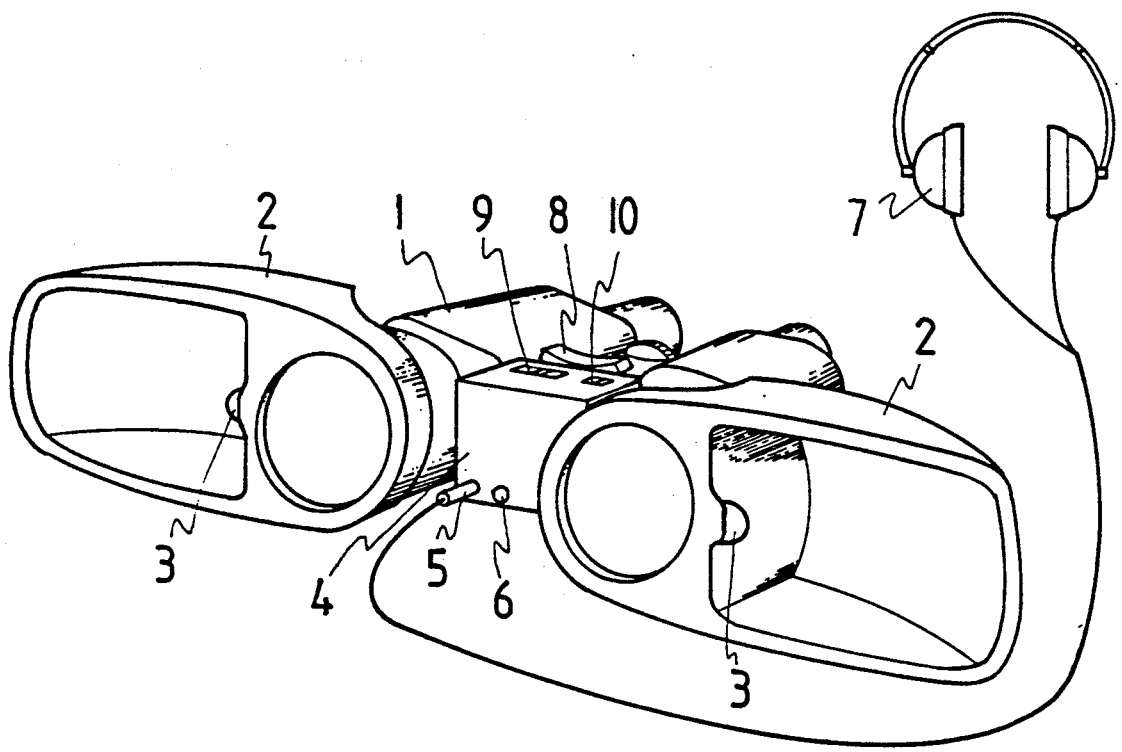

United States Patent [19]

Alasaarela et al.

[11] Patent Number: 5,007,091
[45] Date of Patent: Apr. 9, 1991

[54] PROCEDURE AND DEVICE FOR FACILITATING AUDIOVISUAL OBSERVATION OF A DISTANT OBJECT

[75] Inventors: Esko Alasaarela, Jokirinne; Pekka Adolfsen, Kemi; Timo Rahkonen, Jyväskylä, all of Finland

[73] Assignee: UTK Uuden Teknologian Keskus Oy, Finland

[21] Appl. No.: 424,251

[22] PCT Filed: Apr. 22, 1988

[86] PCT No.: PCT/FI88/00060
§ 371 Date: Oct. 20, 1989
§ 102(e) Date: Oct. 20, 1989

[87] PCT Pub. No.: WO88/08657
PCT Pub. Date: Nov. 3, 1988

[30] Foreign Application Priority Data
Apr. 23, 1987 [FI] Finland .................................. 871793

[51] Int. Cl.⁵ ............................................ H04R 5/027
[52] U.S. Cl. ...................................................... 381/26
[58] Field of Search ...................... 381/26, 25; 358/229, 358/144

[56] References Cited

U.S. PATENT DOCUMENTS

| | | |
|---|---|---|
| 3,253,457 | 5/1966 | Pakala et al. .......................... 73/71.4 |
| 3,657,490 | 4/1972 | Scheiber . |
| 3,665,121 | 5/1972 | Weiss . |
| 3,715,500 | 2/1973 | Sessler et al. . |
| 3,770,911 | 11/1973 | Knowles et al. . |
| 3,793,489 | 2/1974 | Sank . |
| 3,837,736 | 9/1974 | Ogiso et al. ............................ 352/12 |
| 3,881,056 | 4/1975 | Gibson et al. . |
| 3,983,336 | 9/1976 | Malek et al. . |
| 4,241,957 | 12/1983 | Wallace, Jr. . |
| 4,401,859 | 8/1989 | Watson . |
| 4,633,498 | 12/1986 | Waruke et al. ........................ 381/26 |
| 4,741,035 | 4/1988 | Genuit .................................. 381/26 |

FOREIGN PATENT DOCUMENTS

| | | |
|---|---|---|
| 381530 | 9/1923 | Fed. Rep. of Germany . |
| 2331423 | 1/1975 | Fed. Rep. of Germany . |
| 2545993 | 4/1976 | Fed. Rep. of Germany . |
| 21869 | 11/1911 | Norway . |
| 8704805 | 8/1987 | PCT Int'l Appl. . |
| 8205225-9 | 2/1984 | Sweden . |

Primary Examiner—Forester W. Isen

[57] ABSTRACT

Device for listening to and recording of the sounds produced by birds or other distant objects. The device (FIG. 1) is attached to a pair of binoculars or a telescope and consists of one or more directional microphones, microphone structures or sets of microphones, a microphone and headphone amplifier and a pair of headphones, the directional microphone structures (2, 3) and the amplifier unit (4) with the headphones (7) being attached to the binoculars (1) by suitable means. An audio signal can be supplied from the amplifier to an external recording device, or a recording device may be integrated with the device of the invention. Used together with a pair of binoculars or a telescope, the device provides a light and easy-to-use means of audiovisual observation of distant objects, and when provided with an integral or external tape recorder it is also suited for amateur use for the recording of wildlife sounds.

8 Claims, 4 Drawing Sheets

U.S. Patent    Apr. 9, 1991    Sheet 1 of 4    5,007,091

PROCEDURE AND DEVICE FOR FACILITATING AUDIOVISUAL OBSERVATION OF A DISTANT OBJECT

The invention concerns a listening device for supervision or wildlife observation purposes, said device being mounted on a pair of binoculars or a telescope and provided with means for electronic amplification of sound.

The objects to be observed or supervised are generally at a distance necessitating the use of binoculars or a telescope and a directional sonic detector with an amplifier. Sometimes it is also necessary to record the sounds produced by the object observed (e.g. when a strange bird is to be later identified on the basis of its utterins). Among the most commonly used listening and recording devices is the parabolic reflector, which is about 1 m in diameter and is used with an amplifier and a recording device, but such a reflector is difficult to direct accurately. U.S. Pat. No. 3,881,056 proposes an apparatus using a hand-held parabolic reflector of a diameter of about 45 cm, which is somewhat easier to handle but is still very difficult to use together with binoculars. Of the numerous other types of directional microphones (e.g. U.S. Pat. Nos. 4,401,859, 3,793,489, 3,715,500, 3,657,490 or 4,421,957), none has become widely accepted for use in wildlife observation.

There is a Norwegian patent (No. 21869) of the year 1911 which proposes a hearing aid that is mounted on opera glasses. The hearing aid consists of trumpets placed around the objectives of the opera glass, with the trumpet opening in the forward direction, the sound being passed from the rear end of the trumpet to the user's ears via hose pipes like those of a stethoscope.

There are various hearing aids (e.g. U.S. Pat. Nos. 3,983,336, 3,665,121, 3,770,911) which can be used together with binoculars. However, they are not designed for use by people with normal hearing and have no provision for the recording of sound. Besides, hearing aids mounted on the spectacle frame are difficult to use together with binoculars.

There are several types of microphones of integral construction which are designed for use with narrow-film cameras or video cameras, e.g. U.S. Pat. No. 3,837,736 (Camera and microphone having variable directional characteristics in accordance with a zoom lens control). These microphones are generally designed to be directionally selective in the first place with regard to acoustic signals recorded indoors from a distance of a few meters, so that the sensitivity of the microphone and amplifier is not sufficient for the recording of weak sounds from a long distance. Although the microphones used in connection with narrow-film or video cameras are applicable for recording and listening purposes, the visual perception obtained through the view-finder of the camera is not comparable in brilliance and sharpness to the image provided by binoculars or a telescope the cameras often use ground-glass view-finder lenses with inferior contrast and luminous efficiency. Besides, the cameras are mainly designed for the recording of images (and sound) and not for audiovisual observation as in the case of the present invention.

The recording equipment currently used in wildlife observation faces the user with many problems due to the large size and weight of the directional microphone and tape recorder. The sizeable directional microphone is also sensitive to structureborne noise, necessitating the use of a stand. In addition to the audio recording equipment, a separate telescope or a pair of binoculars is needed to enable the object to be located, but since the directional settings of the two observation devices have to be adjusted separately—a task requiring great accuracy—simultaneous visual and acoustic observation is difficult. The combination of an opera glass and an ear trumpet proposed by the NO patent No. 21869 comes closest to the idea of the present invention, but as a purely mechanical construction it is clearly not suited for recording purposes and it has no provision for volume or tone control. In outdoor use the trumpets are sensitive to wind noise and the device is inconvenient to use because of the stethoscope pipes required. All these drawbacks are eliminated by combining an electronic amplifier with a pair of binoculars, which makes it possible to process the acoustic signal in a variety of ways, resulting in a decisive improvement in sound quality. For instance, low-frequency structure-borne and wind noise can be filtered out, and an enhanced stereo effect can be created to facilitate the directional adjustment.

The device of the invention provides decisive improvements regarding the drawbacks mentioned above. To achieve this, the device of the invention is characterized as specified in claim 1. The chief advantages of the invention are the integral construction of the listening device and the viewing device (binoculars or telescope), the ease of directional adjustment and the small size, light weight and versatility of the device as compared to conventional audio recording devices used in wildlife observation.

In the following, the invention is described in detail with reference to the drawings attached.

FIG. 1 Device of the invention, mounted on a pair of binoculars.

Figure 2:
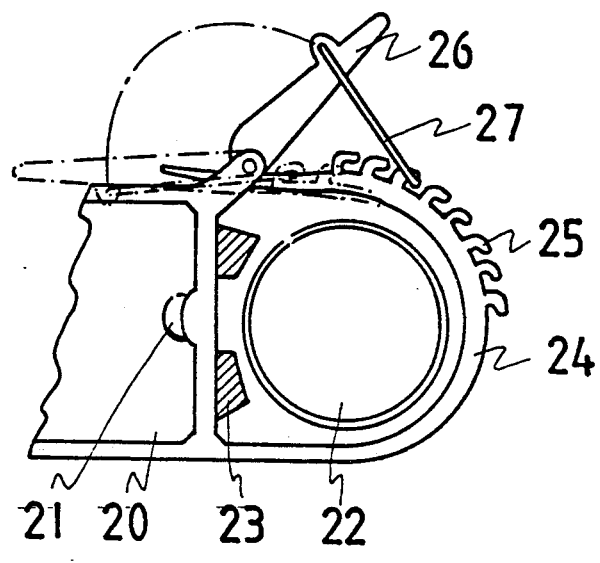

FIG. 2 Example of a quick attachment system enabling the device to be detached and fitted to different types of binoculars or telescopes.

Figure 3:
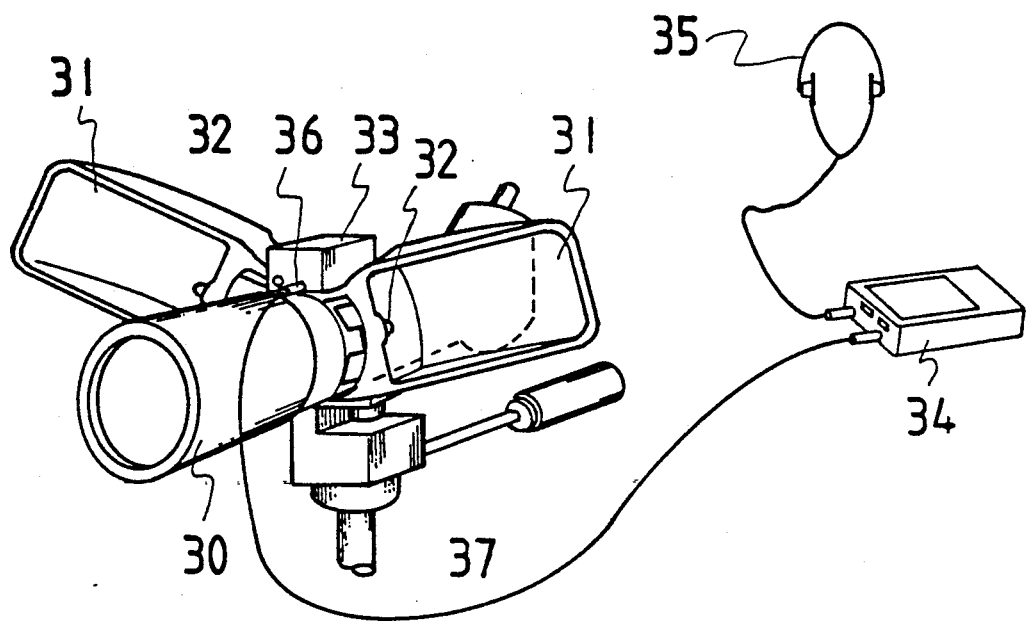

FIG. 3 Device of the invention, mounted on a telescope and used for sound recording.

Figure 4:
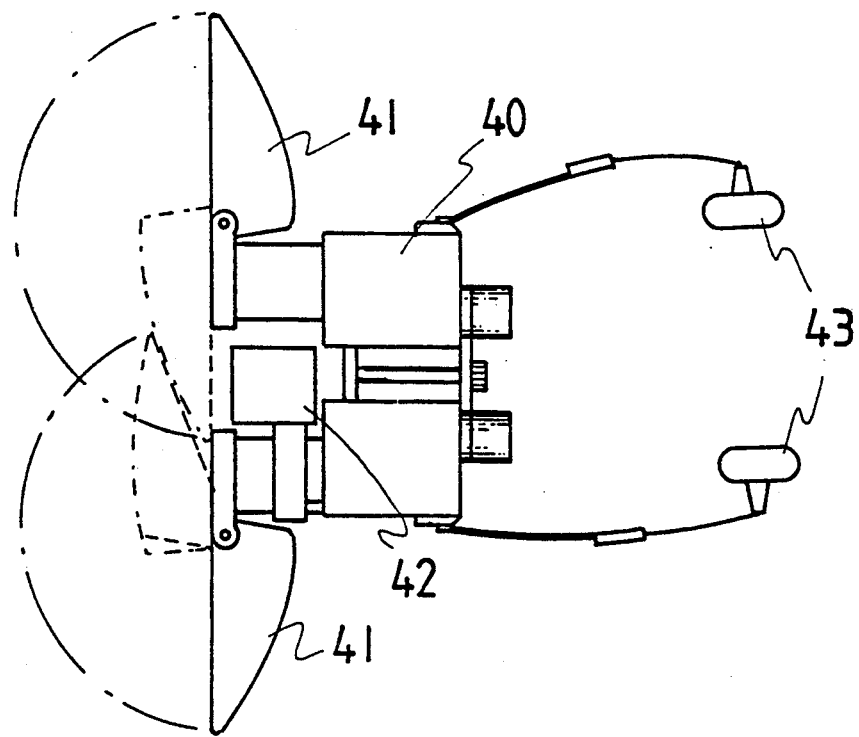

FIG. 4 Example of foldable directional microphones and integral headphones.

Figure 5:
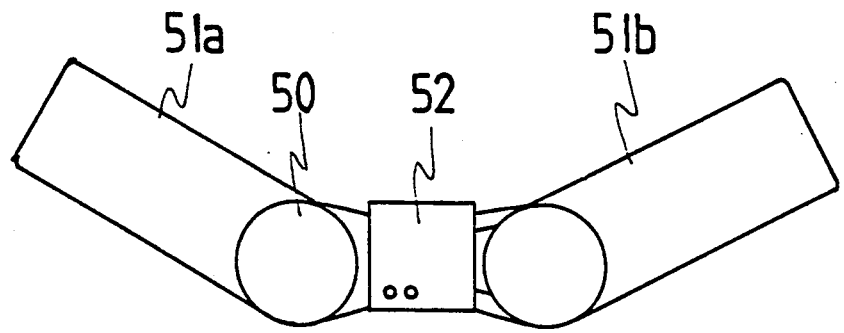

FIG. 5 Example of achieving an improved radiation pattern via appropriate positioning of the microphones.

Figure 6:
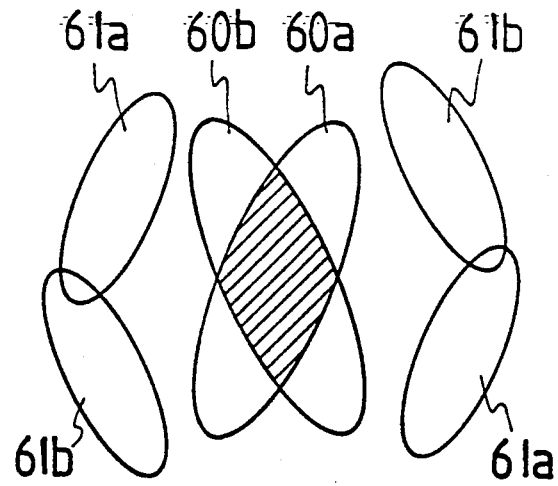

FIG. 6 Radiation patterns obtained by the arrangement in FIG. 5

Figure 7:
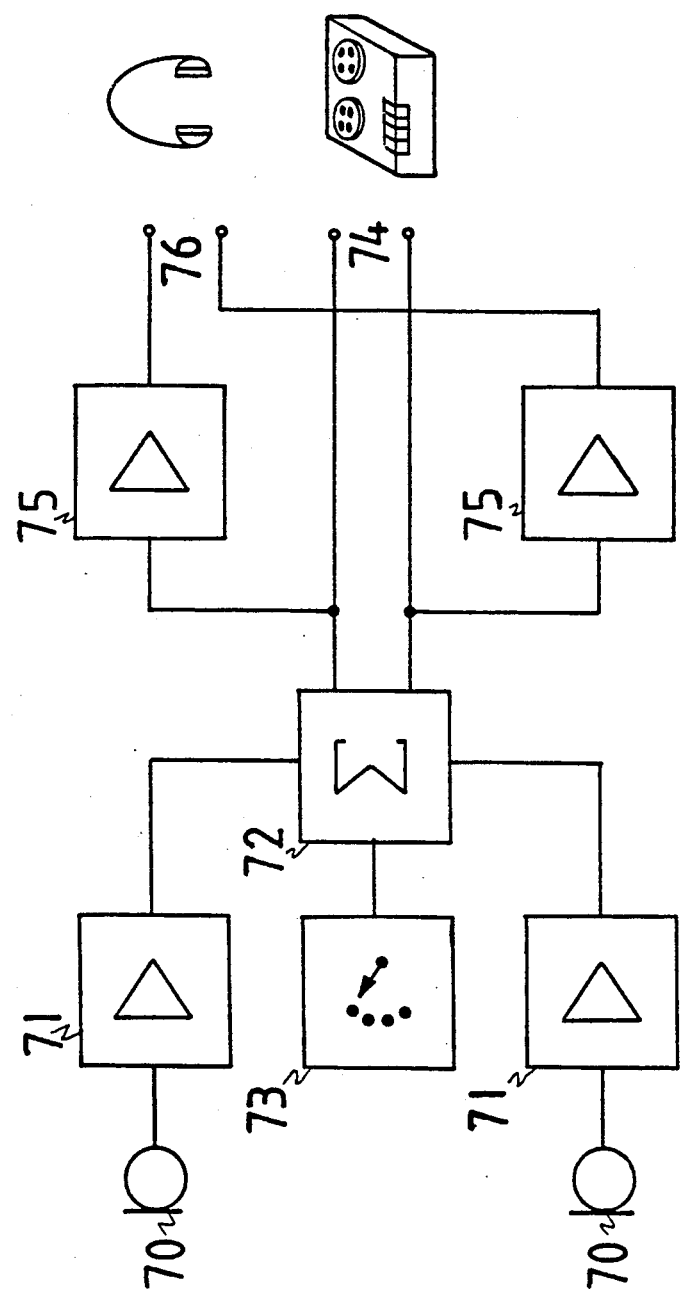

FIG. 7 Block diagram of the electronics used in the device.

In the following examples, the directional microphone elements are small parabolic reflectors. It is to be noted that the device of the invention may use any other kind of directional microphone structure suited for the purpose.

FIG. 1 shows the device of the invention as mounted on a pair of binoculars 1, consisting of two parabolic reflectors 2, the reflected sound signal being converted into an electrical form by means of suitable microphone capsules 3. The microphone signals are passed into an amplifier 4 where the signals are amplified and processed as desired. The amplified signal is output via a headphone connection 5, where a pair of headphones 7 is plugged in for simultaneous listening. For recording, the amplified signal is obtained from a separate recording connection 6. For listening and recording, there is a volume control 8 and a tone control 9. In addition, the directional and stereo effects can be adjusted with a selector switch 10.

FIG. 2 illustrates a possible arrangement for quick attachment of the device on a pair of binoculars. The parabolic reflector 20, provided with a microphone capsule 21, is attached to one of the objectives 22 of the binoculars by means of a strap 24 which is tightened around the objective. That side of the reflector which is pressed against the objective is provided with cushion pads 23 which adapt to the curvature of the objective surface and act as friction grips keeping the reflector in position relative to the objective. The strap 24 is provided with locking studs 25 which are engaged by a locking link 27 pivoted on a locking lever 26, shown in its open position in the drawing. When the locking lever 26 is turned into the position indicated by dotted lines, the strap is tightened and the cushion pads 23 are pressed tightly against the side of the objective. By using a long enough strap provided with a sufficient number of locking studs 25, the device can be mounted on binoculars and telescopes of widely differing sizes and types.

FIG. 3 illustrates the device of the invention as mounted on a telescope and used for the recording of sound. The telescope 30 is attached to a stand 37, and the reflectors, 31 provided with microphones 32, are attached to the telescope. The amplifier 33 is placed on top of the telescope, a portable tape recorder 34 being plugged into the appropriate connection 36 of the amplifier. When a recorder is used, the headphones 35 are preferably connected to the recorder's headphone socket for tape monitoring.

FIG. 4 shows certain solutions facilitating the transportation of the device. The binoculars 40 are provided with parabolic reflectors 41, an amplifier 42 and headphones 43. The reflectors are pivoted in front of the binoculars so that they can be folded up to protect the objectives. The headphones may likewise be integrally constructed and they can also be folded up to protect the lenses, or they can be provided with telescopic arms which can be collapsed for transport, so that the dimensions of the binoculars will not be significantly increased by the headphones.

FIG. 5 is an example of positioning the directional microphone structures in such a way that when the microphone signals are directed so as to obtain a monophonic response, the main beams in the radiation patterns of the microphone structures will strengthen each other but the side beams will not be summed in the same direction. The figure shows the binoculars in front view, with reference number 50 indicating the right-hand objective, 51a and 51b right- and left-hand microphone structures, and 52 the amplifier unit.

FIG. 6 represents the radiation pattern, also seen from the front, of the device as shown in FIG. 5. 60b is the main beam in the radiation pattern of the right-hand microphone structure, 60a the corresponding beam of the left-hand microphone structure, and 61a and 61b the side beams of the right- and left-hand microphone structures respectively. As seen from the figure, the asymmetric side beams do not fall in the same place and therefore do not strengthen each other.

FIG. 7 shows a block diagram of the electronics used in the device of the invention. The microphones 70 of the right and left channels are connected to the corresponding microphone amplifiers 71, followed by a summing unit 72 whose operation can be varied, as explained later, by means of a switching or control unit 73. From the summing unit, the signal is taken to the recorder connection 74 and to headphone amplifiers 75 and further to the headphone connection 76.

The summing unit 72 provides the options of e.g. a fully stereophonic response (the signals of the two microphones do not affect each other), a spatial (electronically enlarged) stereo effect to facilitate the directing of the microphone structures, a fully monophonic response, which means that identical signals are supplied to both headphones and that the radiation pattern of the microphone set consisting of the directional microphones is sharpest and the noise at a minimum, or frequency-dependent summation in such manner that low frequencies up to a given limit are summed to produce a monophonic response while higher frequencies are reproduced stereophonically. One of the advantages of the latter option is that when small-size directional microphone structures with a poor low-frequency directivity are used, a good radiation pattern is obtained even for low-frequency sounds while a stereo effect is still preserved to facilitate location of the object. At the same time, this prevents the radiation pattern of high-frequency sounds from becoming too narrow and the side beams from becoming too strong.

In the examples used to describe the invention, the directional microphone element consists of two small parabolic reflectors, but it is possible to use any other microphone structure that suits the purpose. Possible alternatives are e.g. a microphone surface consisting of a suitable acoustically sensitive membrane (such as a film of pvdf-material, or an electrothermomechanical film as developed at Tampere University of Technology), a set of several microphones, a gradient microphone and a tubular microphone with one or more tubes. Also, instead of a parabolic reflector, a reflector or trumpet of a different form may be used. In addition, the microphone structures can (and should) be provided with suitable windshields. It is to be noted that, depending on the microphone structure selected, the device can be attached to the binoculars or telescope in various ways, so the attachment mechanism illustrated in FIG. 2 is by no means an exclusive possibility.

If necessary, the sound volume and tone controls can be coupled to the focusing control of the binoculars to provide for automatic compensation of the damping, especially of high frequencies, caused by a long distance. The controls can be implemented using a solution that seems best, e.g. rocking-switch controls, which will not be easily confused with the generally rotatable focusing control of the binoculars. If the view angle of the optical device can be adjusted (zoomed), then the radiation pattern of the directional microphones can be adjusted accordingly (cf. U.S. Pat. No. 3,837,736).

In addition to the functions mentioned above, the amplifier electronics may include filtering functions to correct the microphone response or the damping of high frequencies caused by the atmosphere, or noise reduction by suitably limiting the passband (e.g. by setting the lower limiting frequency at 100–300 Hz). Automatic gain control may be used and the distortion caused by strong sound signals may be reduced by means of amplitude limiters or soft-clipping circuits. If the signal-to-noise ratio and the wide dynamic range of natural sounds cause problems, compression may be used to level the variations in signal strength. The signal output for recording may be provided with a level control to enable any commercial recording device (e.g. portable mini-recorders) to be connected to the amplifier. If necessary, a recording device may be integrated with the amplifier, in which case the two devices can use a common power supply, and if desirable for reasons of convenience (weight of the equipment), the amplifier and recorder may be constructed as a separate unit to be carried on a shoulder strap while only the light-weight directional microphones are mounted on the binoculars or telescope.

The device of the invention may be powered either by batteries, an accumulator or solar cells. There is ample space for solar cells e.g. on the backside of the parabolic reflectors. The device may have a provision for the connection of an external power supply to allow the recharging of batteries or the use of a separate power source, e.g. that of a tape recorder.

We claim:

1. Device for audiovisual observation of a distant object, said device comprising:
    optical means for viewing the object, said optical means including focus control means for adjusting the focus of the optical means; and
    listening means for listening to the object, said listening means including
        at least two sound receiving means for receiving sounds, said sound receiving means producing output signals,
        amplifying means connected to the sound receiving means for amplifying signals from the sound receiving means, and
        headphone means connected to the amplifying means for reproducing amplified signals into sounds;
    the output signals of the sound receiving means being acoustically or electronically connected so that one of the following applies:
    (a) the signals from the sound receiving means are monophonic;
    (b) the signals from the sound receiving means are stereophonic;
    (c) a spatial stereophonic effect in the signals from the sound receiving means is produced by using an electronic means;
    (d) the signals from the sound receiving means are processed in a frequency-dependent manner, so that the signals are monophonic at low frequencies to improve directivity and stereophonic at high frequencies to facilitate location of the object;
    said amplifying means being provided with sound volume and tone control means for controlling the volume and tone of the amplified signals, the volume and tone control means being connected to the focus control means of the optical means so that the gain or the tone, i.e. dependency on frequency, of the amplifying means depends on the focusing adjustment of the optical means in such manner that the damping caused by a long listening distance in the sound or, in the case of tone controls, in the high-frequency sounds, is partially or totally compensated.

2. The device of claim 1 wherein the amplifying means is provided with a limiter or compressor to avoid excessive signal amplitudes.

3. The device of claim 1 wherein the sound receiving means are microphones.

4. The device of claim 3 wherein the microphones include an integral surface which can be folded.

5. The device of claim 1 further comprising a recording means for recording of sound.

6. The device of claim 1 wherein the amplifying means is a separate unit.

7. The device of claim 1 wherein the sound receiving means includes a reflector for receiving sound.

8. The device of claim 1 wherein the sound receiving means includes a plurality of microphones whose radiation pattern is adjusted by amplifying the signals obtained from different microphones.

* * * * *